United States Patent
Rosansky et al.

(10) Patent No.: US 11,891,323 B2
(45) Date of Patent: *Feb. 6, 2024

(54) SALT SEPARATION AND DESTRUCTION OF PFAS UTILIZING REVERSE OSMOSIS AND SALT SEPARATION

(71) Applicant: Revive Environmental Technology, LLC, Columbus, OH (US)

(72) Inventors: Stephen H. Rosansky, Columbus, OH (US); Michael Miller, Powell, OH (US); Patrick Norris, Columbus, OH (US); Darwin Argumedo, Columbus, OH (US); Douglas Hendry, Columbus, OH (US); Ian Haggerty, Dublin, OH (US); Keith Brown, Columbus, OH (US); Joshua James, Columbus, OH (US); Joseph Casciano, Columbus, OH (US); Slawomir Winecki, Columbus, OH (US); Vivek Lal, Columbus, OH (US); Tom McGuinness, Columbus, OH (US)

(73) Assignee: Revive Environmental Technology, LLC, Columbus, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/883,600

(22) Filed: Aug. 9, 2022

(65) Prior Publication Data
US 2023/0047367 A1   Feb. 16, 2023

Related U.S. Application Data
(63) Continuation of application No. 17/396,599, filed on Aug. 6, 2021, now Pat. No. 11,407,666.
(Continued)

(51) Int. Cl.
B01D 61/02 (2006.01)
B01D 61/08 (2006.01)
(Continued)

(52) U.S. Cl.
CPC ............ C02F 9/00 (2013.01); B01D 61/025 (2013.01); B01D 61/08 (2013.01); B01D 61/10 (2013.01);
(Continued)

(58) Field of Classification Search
CPC . B01D 61/025; B01D 2311/2676; C02F 1/02; C02F 1/38; C02F 1/441; C02F 1/72
See application file for complete search history.

(56) References Cited

U.S. PATENT DOCUMENTS

| | | | |
|---|---|---|---|
| 4,861,497 A | 8/1989 | Welch et al. | |
| 5,232,604 A | 8/1993 | Swallow et al. | |

(Continued)

FOREIGN PATENT DOCUMENTS

| | | | |
|---|---|---|---|
| CN | 102899671 A | * | 1/2013 |
| IT | 201800007111 A1 | | 1/2020 |

(Continued)

OTHER PUBLICATIONS

Jiang W—CN-102899671-A machine translation—Jan. 2013 (Year: 2013).*

(Continued)

*Primary Examiner* — Bradley R Spies
(74) *Attorney, Agent, or Firm* — Frank Rosenberg

(57) ABSTRACT

Per- and polyfluoroalkyl substances (PFAS) are destroyed by oxidation in supercritical conditions. PFAS in water is concentrated in a reverse osmosis step and salt from the resulting solution is removed in supercritical conditions prior to destruction of PFAS in supercritical conditions.

19 Claims, 4 Drawing Sheets

Related U.S. Application Data

(60) Provisional application No. 63/062,251, filed on Aug. 6, 2020.

(51) Int. Cl.

| | | |
|---|---|---|
| *B01D 61/10* | (2006.01) | |
| *C02F 1/02* | (2023.01) | |
| *C02F 1/38* | (2023.01) | |
| *C02F 1/44* | (2023.01) | |
| *C02F 1/52* | (2023.01) | |
| *C02F 1/72* | (2023.01) | |
| *C02F 101/36* | (2006.01) | |
| *C02F 103/06* | (2006.01) | |
| *C02F 9/00* | (2023.01) | |
| *B04C 5/04* | (2006.01) | |
| *B04C 5/081* | (2006.01) | |
| *B04C 5/085* | (2006.01) | |
| *B04C 5/20* | (2006.01) | |
| *C04B 35/12* | (2006.01) | |
| *C04B 35/622* | (2006.01) | |

(52) U.S. Cl.
CPC ............... *B04C 5/04* (2013.01); *B04C 5/081* (2013.01); *B04C 5/085* (2013.01); *B04C 5/20* (2013.01); *C04B 35/12* (2013.01); *C04B 35/62222* (2013.01); *B01D 2311/08* (2013.01); *B01D 2311/103* (2013.01); *B01D 2311/12* (2013.01); *B01D 2311/2634* (2013.01); *B01D 2311/2642* (2013.01); *B01D 2311/2649* (2013.01); *B01D 2311/2676* (2013.01); *B01D 2313/221* (2022.08); *C02F 1/02* (2013.01); *C02F 1/38* (2013.01); *C02F 1/441* (2013.01); *C02F 1/52* (2013.01); *C02F 1/72* (2013.01); *C02F 2101/36* (2013.01); *C02F 2103/06* (2013.01); *C02F 2303/10* (2013.01); *C04B 2235/9692* (2013.01)

(56) References Cited

U.S. PATENT DOCUMENTS

| | | | |
|---|---|---|---|
| 5,492,634 A * | 2/1996 | Hong | C02F 1/70 210/915 |
| 6,017,460 A | 1/2000 | Eller et al. | |
| 6,423,236 B1 | 7/2002 | Shiota et al. | |
| 6,475,396 B1 * | 11/2002 | Wofford, III | B01J 3/008 210/205 |
| 6,984,768 B2 | 1/2006 | Ginosar et al. | |
| 7,713,503 B2 | 5/2010 | Koehler et al. | |
| 8,017,089 B2 | 9/2011 | Titmas | |
| 8,541,640 B2 * | 9/2013 | Bolanos Barrera | A62D 3/20 588/1 |
| 9,328,008 B2 | 5/2016 | Wang et al. | |
| 9,370,677 B2 | 6/2016 | Ruiz et al. | |
| 9,526,936 B2 | 12/2016 | Kometani | |
| 9,694,401 B2 | 7/2017 | Kerfoot | |
| 10,040,708 B2 | 8/2018 | Dickson | |
| 10,287,185 B2 | 5/2019 | Nickelsen et al. | |
| 10,675,664 B2 | 6/2020 | Oberle et al. | |
| 10,828,617 B2 | 11/2020 | Ruiz et al. | |
| 10,851,006 B2 | 12/2020 | Cai | |
| 2015/0128642 A1 * | 5/2015 | Wang | C02F 1/385 62/617 |
| 2016/0075957 A1 * | 3/2016 | Cooke | C10J 3/72 422/240 |
| 2016/0145122 A1 * | 5/2016 | Wilson | B01D 19/0057 202/83 |
| 2019/0185361 A1 * | 6/2019 | Cai | B01D 1/0017 |
| 2020/0155885 A1 | 5/2020 | Strathmann et al. | |
| 2020/0276555 A1 * | 9/2020 | Ruiz | B01J 19/0013 |
| 2020/0407241 A1 | 12/2020 | Dejarme et al. | |
| 2021/0300789 A1 | 9/2021 | Phillips | |

FOREIGN PATENT DOCUMENTS

| | | | | |
|---|---|---|---|---|
| JP | 2010131478 A | 6/2010 | | |
| WO | WO-2018109390 A1 * | 6/2018 | ......... | B01J 19/0013 |

OTHER PUBLICATIONS

Cilliers, J. J., "hydrocyclones for particle size separation", Particle Size Separation, 2000 pp. 1819-1825.

Marrone P. A. et al., "Salt precipitation and scale control in supercritical water oxidation—part B: commercial/full-scale applications", J. of Supercritical Fluids 29 (2004) 289-312.

Vadillo, V., et al. "Supercritical Water Oxidation", Advanced Oxidation Processes for Wastewater Treatment: Emerging Green Chemical Technology (2018) pp. 333-358.

Li, Y. et al., "Water Oxidation for Environmentally Friendly Treatment of Organic Wastes", Advanced Supercritical Fluids Technologies (2019).

Mitchell S. M., et al. "Degradation of Perfluorooctanoic Acid by Reactive Species Generated through Catalyzed H2O2 Propagation Reactions", Environmental Science & Technology Letters (2014) 1:117-121.

Bentel, Michael J. et al. "Defluorination of Per- and Polyfluoroalkyl Substances (PFASs) with Hydrated Electrons: Structural Dependence and Implications to PFAS Remediation and Management", Environmental Science & Technology Letters (2019) 53:7.

Wang F., et al., "Influence of calcium hydroxide on the fate of perfluorooctanesulfonate under thermal conditions", Journal of Hazardous Materials, 192(3), 1067-1071.

Dickenson_2016 "Treatment Mitigation Strategies for Poly- and Perfluoroalkyl Substances", Web Report #4322, Water Research Foundation (2016).

"About Supercritical Water Oxidation or SCWO," Sanitation Solutions at Duke University Community Treatment Project, Accessed Dec. 2022, https://sanitation.pratt.duke.edu/community-treatment/about-community-treatment-project.

Nzerbie N. et al.,"Physico-Chemical Processes for the Treatment of Per- and Polyfluoroalkyl Substances (PFAS): A Review", Critical Reviews in Environmental Science and Technology, (2019) 49:10 1-50.

Ross I. et al., "A review of emerging technologies for remediation of PFASs", Remediation (2018) 28:101-126.

Ballenghien, David "A new waste treatment technology for cleaner waters PI System deployment to accelerate R&D on a pilot plant", Duke University.

Miller et al. in "Supercritical water oxidation of a model fecal sludge with the use of a co-fuel" Chemosphere 141 (2015) 189-196.

PCT Invitation from International Application PCT/US/2021/045121 mailed Nov. 23, 2021.

International Search Report and Written Opinion for International Application No. PCT/US/2021/045121 dated Jan. 13, 2022.

Machine translation of Description JP 2010131478 A.

Machine translation of Description IT 201800007111 A1.

* cited by examiner

SALT SEPARATION AND DESTRUCTION OF PFAS UTILIZING REVERSE OSMOSIS AND SALT SEPARATION

RELATED APPLICATIONS

This application is a continuation of U.S. patent application Ser. No. 17/396,599, filed 6 Aug 2021 and claims priority to U.S. Provisional Patent Application Ser. No. 63/062,251 filed 6 Aug. 2020.

INTRODUCTION

Per- and polyfluoroalkyl substances (PFAS), including perfluorooctane sulfonate (PFOS) and perfluorooctanoic acid (PFOA), and hundreds of other similar compounds, have been widely used in the United States in a multitude of applications. There are significant concerns associated with these compounds due to widespread contamination coupled with uncertainties about risks to human health and the environment. PFAS are molecules having chains of carbon atoms surrounded by fluorine atoms. The C—F bond is very stable enabling the compounds to persist in the natural environment. Some PFAS include hydrogen, oxygen, sulfur, phosphorus, and/or nitrogen atoms. One example is PFOS:

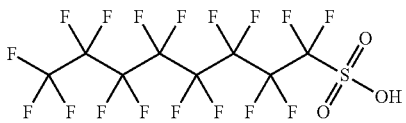 [SMILES: O=S(=O)(O)C(F)(F)C(F)(F)C(F)(F)C(F)(F)C(F)(F)C(F)(F)C(F)(F)C(F)(F)F]

Although some PFAS compounds with known human health risks have been voluntarily phased out (PFOA and PFOS), legacy contamination remains. Replacement PFAS compounds have been introduced with limited understanding of their health risks. Currently, only PFOA and PFOS are addressed in Lifetime Health Advisories at the Federal level, with no established maximum contaminant level (MCL) to regulate the acceptable level of these and other PFAS compounds in drinking water. PFAS contamination in drinking water sources in 1,582 locations in 49 states as of May 2020. Currently used techniques for treating PFAS-contaminated water are expensive, and management of spent media is costly and may result in long-term liability.

Numerous methods have been developed for remediating PFAS in the environment. For example, Oberle et al. in US 2019/0314876 describes a method and system for remediating soil containing PFAS in which the soil is heated and the PFAS volatilized, captured and condensed, steam added, and then the concentrated PFAS solution subjected to electro oxidation.

Application of SCWO to PFAS is relatively new and presents new challenges. SCWO of organic compounds has long been known and is described in numerous papers and patents. For example, Welch et al. in U.S. Pat. No. 4,861,497 described the use of a liquid phase oxidant such as hydrogen peroxide or ozone in supercritical water for the destruction of organic compounds; testing with destruction of propylene glycol at 750 to 860° F. at 5000 psia (pounds per square inch atmospheric) resulted in about 98% destruction. Swallow et al. in U.S. Pat. No. 5,232,604 described SCWO of organic compounds with an oxidant such as hydrogen peroxide and a reaction rate enhancer such as nitric oxide; in one example, sodium hydroxide and sodium nitrate were used to neutralize hydrochloric acid formed in the oxidation of methylene chloride. Aquarden Technologies in US Published Patent Application No. 2019/0185361 notes that in the SCWO process precipitation occurs in a zone where the fluid goes from sub-critical to super-critical and designed a reactor with a residue outlet connection near this zone. Miller et al. in "Supercritical water oxidation of a model fecal sludge with the use of a co-fuel" Chemosphere 141 (2015) 189-196 reported on the SCWO reaction of a feces simulant in the presence of 48% excess oxygen. The use of auxiliary fuels can be used to generate hydrothermal flames in SCWO reactors that are characterized by high temperatures, typically above 1000° C. See "Supercritical Water Oxidation," in Advanced Oxidation Processes for Wastewater Treatment," (2018), 333-353.

Despite extensive prior efforts to develop systems for destroying PFAS, there remains a need for efficient systems for treating PFAS compositions and the complete destruction of PFAS.

SUMMARY OF THE INVENTION

Initially, water or soil samples may be treated to concentrate PFAS in a substantially reduced volume. In some instances, the PFAS-containing media has been stored in a concentrated form and does not require additional treatment to concentrate it. The concentrated PFAS mixtures can be put in containers and shipped to a centralized site for PFAS destruction. Alternatively, in some preferred embodiments, the concentrated PFAS mixtures are treated on-site where they originate. The concentrated PFAS solution is destroyed by Supercritical Water Oxidation (SCWO), which we have found can rapidly result in over 100,000 times reduction in PFAS concentration, for example, a reduction in PFOA from 1700 parts per million (ppm) to 5 parts per trillion (ppt) by weight or less. To enable efficient destruction with little or no external heat supply during steady state operation, fuels may be added (or, in some occurrences, PFAS may be present with sufficient organic materials that serve as the fuel) to supply some or all of the heat needed to power the oxidation. The resulting effluent can then be confirmed to contain little or no PFAS, typically 5 ppt or less, and then be released back into the environment as safe, clean water.

In one aspect, a PFAS-containing aqueous solution is subjected to one or preferably a cascade of plural stages of reverse osmosis to form a brine and a desalted solution. Prior to reverse osmosis (RO), the PFAS-containing aqueous solution is typically subjected to optional filtration and one or more water softening steps in which ions such as Ca and Mn are replaced by Na ions. The net result of the cascade is preferably at least 60%, more preferably at least 80% reduction, and in some embodiments 80 to 95% reduction in volume of the fraction that is subsequently subjected to processing including SCWO to destroy the PFAS. The PFAS is partitioned so that at least 80%, preferably at least 90% or at least 95% or at least about 99% of the PFAS in the initial aqueous mixture is partitioned into the brine fraction resulting from the reverse osmosis process.

In another aspect, the invention provides a method of destroying PFAS, comprising: providing an aqueous solution comprising water and PFAS; subjecting the aqueous solution to reverse osmosis to produce a clean water fraction and a briny concentrated fraction in which the PFAS concentration is at least 50% greater than the aqueous solution; preheating the briny concentrated fraction in a heat exchanger to form a preheated concentrated fraction that is at subcritical conditions; passing the preheated concentrated fraction into a heated pre-reactor where the briny concentrated fraction is converted to supercritical conditions at a first temperature causing sodium chloride to precipitate; removing at least a portion of the sodium chloride to produce a brine-reduced fraction; passing the brine-reduced fraction to a reactor where the fraction is subjected to oxidation under supercritical conditions wherein the concentration of oxidant and/or temperature is higher than in the pre-reactor; producing a clean hot water solution having a concentration of PFAS that is at least 90% less than the aqueous solution; and, optionally, transferring heat from the clean hot water solution to the aqueous solution in the heat exchanger in the preheating step.

The method can be further characterized by one or any combination of the following characteristics: wherein the aqueous solution is filtered prior to reverse osmosis; wherein the effluent passes through a post heat exchanger that is positioned downstream of the pre-reactor and then passes through a pre heat exchanger that is positioned upstream of the pre-reactor (the direction of flow (upstream or downstream) refers to the flow of the aqueous solution being subjected to PFAS destruction); wherein the briny concentrated fraction in which the PFAS concentration is at least 50% greater, that results from the reverse osmosis and prior to the step of removing at least a portion of the sodium chloride, comprises a precipitate and further comprising a step of adding an acid to dissolve the precipitate; wherein the pre-reactor comprises a first tube leading into a collector vessel and a second tube passing out of the collector vessel, wherein the collector vessel comprises an inner diameter that is at least twice as large as the inner diameter of the first tube; and, optionally, wherein a fuel or oxidizer is added to the pre-reactor; wherein the pre-reactor comprises a transcritical hydrocyclone, preferably of the type described herein.

The invention provides an energy efficient method of destroying PFAS that is optionally characterized by the steps of reverse osmosis and salt separation followed by oxidation in a SCWO reactor; and optionally characterizable wherein the aqueous solution comprising water and PFAS has a first volume; wherein 10% or less (or 5% or less, or 1% or less, or 0.1% or less) of the first volume is subjected to supercritical conditions; and wherein, in said method, at least 95% (or at least 98% or at least 99%) of the PFAS in the first volume is destroyed in supercritical conditions.

In another aspect, the invention comprises a system for destroying PFAS, comprising: a reverse osmosis system; a conduit from the reverse osmosis system to a salt separator; wherein the salt separator comprises a first tube leading into a collector vessel and a second tube passing out of the collector vessel, wherein the collector vessel comprises an inner diameter that is at least twice as large as the inner diameter of the first tube; and a conduit from the salt separator to a supercritical reactor.

The system can be further characterized by one or any combination of the following characteristics: wherein the collector vessel comprises a supercritical fluid; wherein the first tube projects at least 5 cm into the collector vessel and the second tube does not project into the interior of the collector tube; further comprising a first heat exchanger disposed in the conduit between the reverse osmosis system and the salt separator; wherein, during operation, the first heat exchanger exchanges heat between a subcritical PFAS-containing aqueous stream and a return stream of PFAS-free water from the supercritical reactor; wherein the first tube projects at least 5 cm further into the collector vessel than the second tube; wherein the heat exchanger is a tube-in-tube heat exchanger; wherein the salt separator comprises a plurality of collector vessels each collector vessel comprising a set of an inlet tube and an outlet tube; wherein each set is at a higher temperature that the previous set in the direction of flow.

In a further aspect, the invention provides a transcritical hydrocyclone, comprising: a conical chamber comprising: an inlet for introducing supercritical fluid into the conical chamber tangentially along an inner wall of the cyclone; a top outlet adapted for flow of a supercritical fluid; an exit pipe adapted for flow of a liquid; a cone disposed in the conical chamber adapted such that a channel can be formed between the inner wall of the cyclone and an outer wall of the cone; and wherein the cone comprises a bottom opening.

The hydrocyclone can be further characterized by one or any combination of the following characteristics: wherein the bottom opening comprises a diffuser—diffuser comprising a plurality of openings; wherein the plurality of openings comprise an open area that is at least two times or at least three times as large as the cross-sectional area of the exit pipe; wherein the openings are angled (not in a straight line (i.e., not the shortest distance)) from the central axis to an inner wall of the lower pipe; further comprising a mechanism adapted to move the cone along the central axis of the conical chamber relative to the inner wall of the conical chamber; comprising heat exchanger thermally connected to an outer wall of the conical chamber; wherein the heat exchanger comprises a jacket for fluid flow.

The invention also provides apparatus having any of the passivating coatings described herein. The invention further provides a method of destroying PFAS, comprising: providing an aqueous solution comprising water and PFAS; preheating the aqueous solution; providing a reactor comprising reactor walls coated with a ceramic coating that is resistant to hydrofluoric acid; treating the solution in the reactor with an oxidant under conditions in which water is in the supercritical phase to produce a clean hot water solution having a concentration of PFAS that is at least 90% less than the aqueous solution; and transferring heat from the clean hot water solution to the aqueous solution in a heat exchanger in the preheating step. Preferably, the ceramic comprises: B4C (boron carbide), SiC (silicon carbide), TaC (tantalum carbide), WC (tungsten carbide), metal fluorides such as YF3 (yttrium fluoride), YN (yttrium nitride), LaF3 (lanthanum fluoride), LaN (lanthanum nitride), YbN, YbF3, or any lanthanide nitride or lanthanide fluoride, HfN (hafnium nitride), CeN (cerium nitride), CeF3 (cerium fluoride), TaN (tantalum nitride), Ta (tantalum), TaF (tantalum fluoride), ZrN (zirconium nitride), ZrF (zirconium fluoride), WN (tungsten nitride), chromium oxide, or combinations thereof.

Any of the inventive aspects may be further defined by one or any combination of the following: wherein the method is carried out in a mobile trailer; the PFAS-containing aqueous mixture comprises at least 100 ppm PFAS and the method decreases the PFAS concentration by at least $10^6$ or $10^7$ or $10^8$; wherein the PFAS is reacted with oxidant in an oxidation reactor and after leaving the reactor the effluent is treated with a solution comprising NaOH, LiOH, or KOH to produce a neutralized solution that can be discharged or recycled to neutralize additional effluent; wherein the neutralized effluent is at least partially evaporated into the air; wherein by taking a PFAS-concentration wherein the PFAS-containing aqueous mixture comprises at least 100 ppm PFAS by weight (in some embodiments at least 500 ppm or at least 1000 ppm PFAS) that the method converts to an effluent comprising 1 ppm or less, or 0.1 ppm or less, or 0.01 ppm or less, or 1.0 ppb or less, or 0.1 ppb or less, or 0.01 ppb or less PFAS; in some embodiments in the range of 1 ppm to 5 ppt (part per trillion) PFAS or less; wherein the PFAS-containing solution is mixed with a solution comprising 30 to 50 wt % $H_2O_2$ at a weight ratio of preferably 30:1 to 70:1 wt % ratio PFAS solution:$H_2O_2$; wherein the PFAS-containing solution is passed through a SCWO reactor with a residence time of 20 sec or less, preferably 10 sec, or 5 sec or less, or 0.5 to 5 seconds; wherein the PFAS-containing solution is added at a rate controlled between 50 and 150 mL/min (at STP); wherein no external heating is required after start-up; wherein the PFAS-containing aqueous mixture comprises at least 100 ppm PFOA and the method decreases the PFOA concentration by at least $10^6$ or $10^7$ or $10^8$, and in some embodiments up to about $10^9$; wherein the method is conducted in a mobile trailer; wherein the method is conducted in a mobile trailer at a PFAS-contaminated site.

Any of the inventive methods may be further defined by, in the overall process, or the SCWO portion of the process, can be characterized by converting a PFAS-concentration of at least 100 ppb PFAS by weight (in some embodiments at least 500 ppb or at least 1000 ppb PFAS) to 1 ppb or less, or 0.1 ppb or less, or 0.01 ppm or less or 7 ppt or less. Alternatively, by converting a PFOA-concentration of at least 100 ppb PFOA by weight (in some embodiments at least 500 ppb or at least 1000 ppb PFOA) to 1 ppb or less, or 0.1 ppb or less, or 0.01 ppb or less, or 5.0 ppt or less PFOA; in some embodiments in the range of 1 ppm to 5 ppt (part per trillion) PFOA. Alternatively, by converting a PFOS-concentration of at least 100 ppb PFOS by weight (in some embodiments at least 500 ppb or at least 1000 ppb PFOS) to 1 ppb or less, or 0.1 ppb or less, or 0.01 ppb or less, or 5.0 ppt or less PFOS; in some embodiments in the range of 1 ppm to 5 ppt (part per trillion) PFOS. The process can also be characterized by the same levels of destruction beginning with a PFAS concentration of 1 ppm or more. In some embodiments, PFAS-contaminated water comprising at least 1000 ppt of at least one (or at least 3 or at least 4 or at least 5 or at least 6) compound selected from the group consisting of PFHxA (perfluorohexanoic acid), PFHpA (perfluoroheptanoic acid), PFOA, PFBS (perfluorobutane sulfonate), PFHxS (perfluorohexane sulfonate), PFHpS (perfluoroheptane sulfonate), and PFOS and combinations thereof, treated by the process is (are) reduced by at least 2 (or at least 3 or at least 4 or at least 5) orders of magnitude. In some embodiments, PFAS-contaminated water comprising at least 100 ppt of at least one (or at least 3 or at least 4 or at least 5 or at least 6) compound selected from the group consisting of PFBA (perfluorobutanoic acid), PFPeA (perfluoropentanoic acid), PFHxA, PFHpA, PFOA, 6:2 FTS (6:2 fluorotelomer sulfonate), and 8:2 FTS (8:2 fluorotelomer sulfonate) and combinations thereof, treated by the process is (are) reduced by at least 2 (or at least 3 or at least 4 or at least 5) orders of magnitude and/or reduced to 5 ppt (or 1 ppt) or less.

The invention also includes apparatus for destroying PFAS comprising a SCWO reactor and any of the components described herein. The invention also includes a system for destroying PFAS comprising a SCWO reactor comprising a PFAS-containing aqueous mixture. The system may comprise any of the conditions and/or fluids described herein.

Removal of salt is advantageous to prevent clogging in the SCWO reactor and may provide additional advantages such as reduced corrosion and production of a PFAS-free aqueous effluent with fewer contaminants.

Leaving the SCWO reactor, the resulting clean water (non-briny) fraction can optionally be passed through adsorbent media such as activated carbon or ion exchange resin and returned to the environment. As with any of the aspects described herein, this pretreatment method may be used by itself or in combination with any of the other aspects or other techniques described herein.

Various aspects of the invention are described using the term "comprising;" however, in narrower embodiments, the invention may alternatively be described using the terms "consisting essentially of" or, more narrowly, "consisting of."

DETAILED DESCRIPTION OF THE INVENTION

Figure 1:
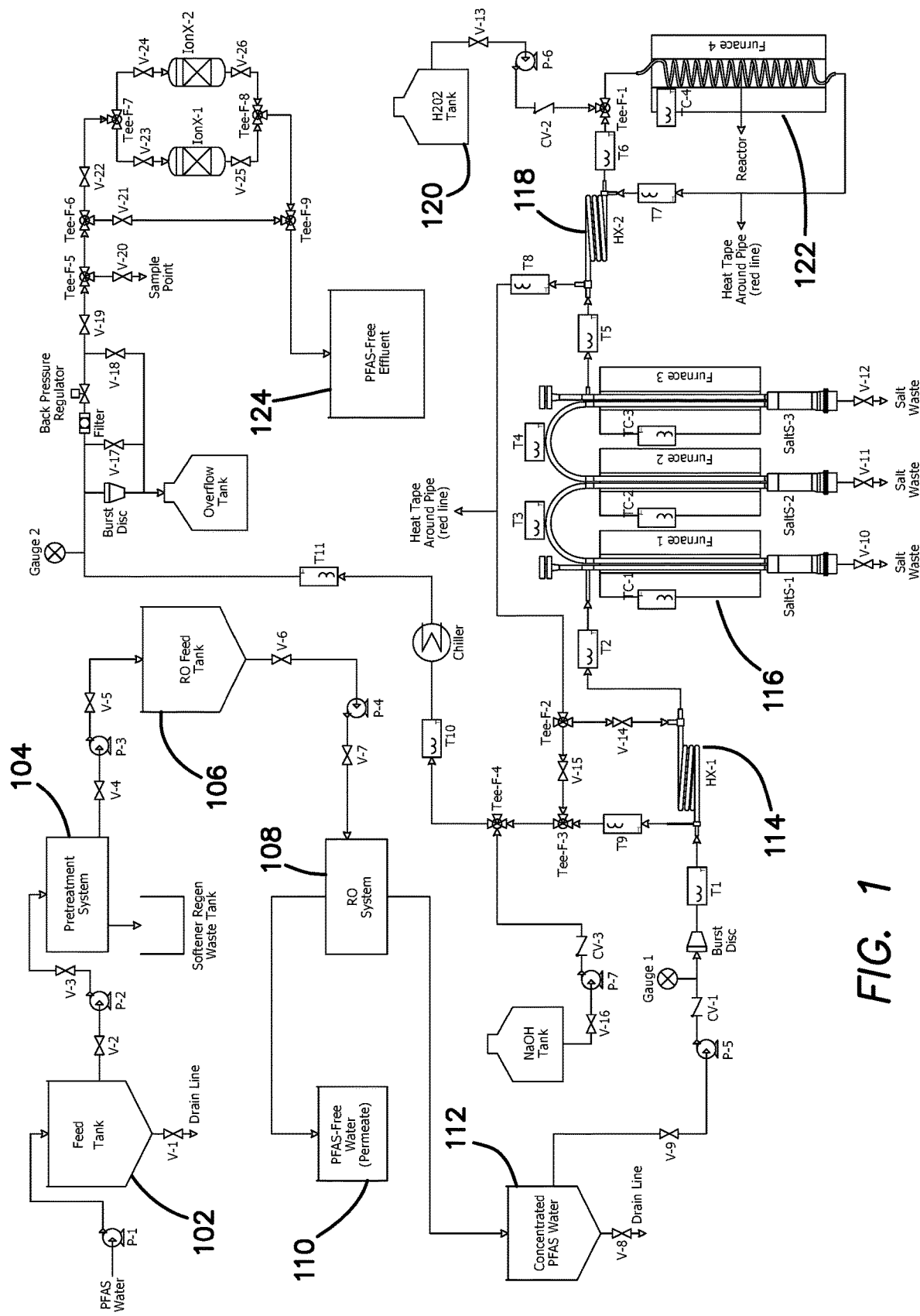
FIG. 1 is a schematic illustration of a water pretreatment system for treating PFAS-contaminated water prior to passage through a SCWO reactor.
Figure 2:
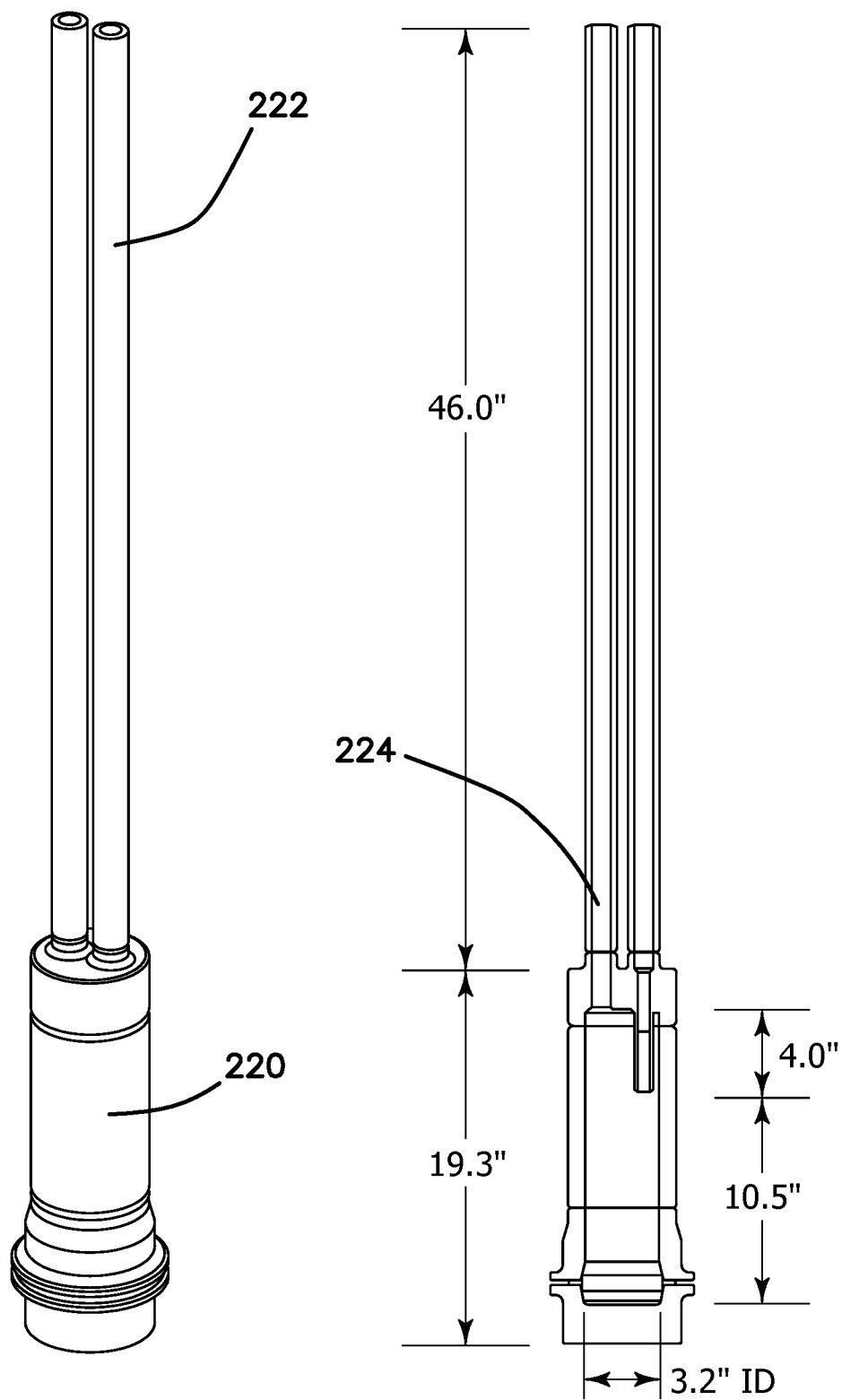
FIG. 2 illustrates a salt separator with inlet and outlet pipes connected to a collector tube.
Figure 3A:
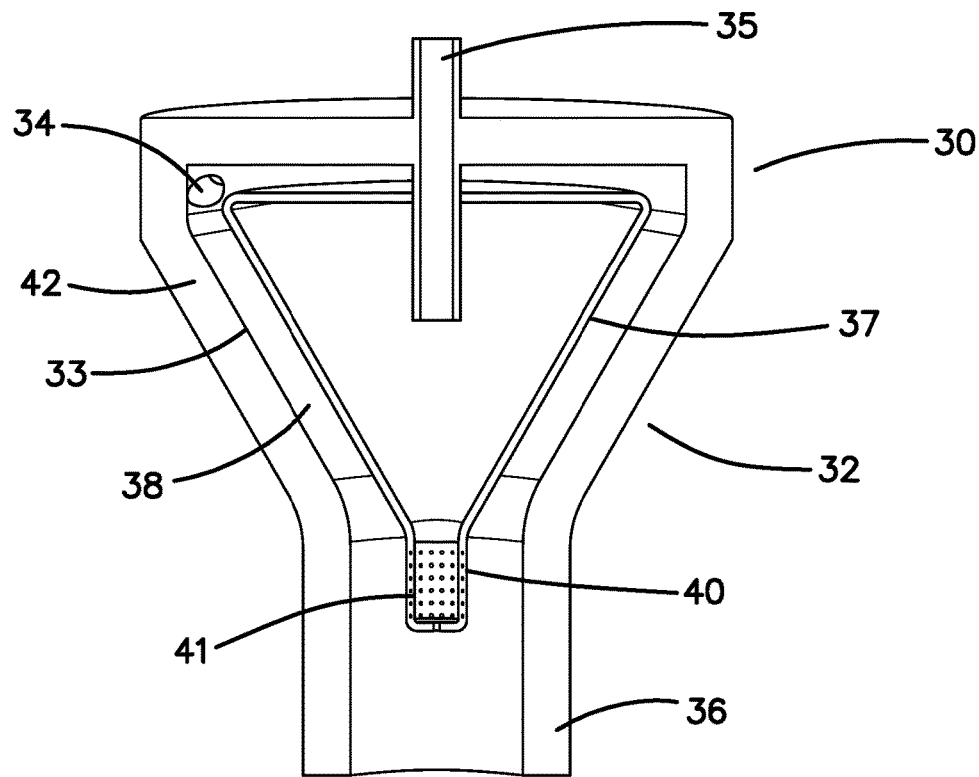
FIG. 3a illustrates a transcritical hydrocyclone with an open channel.
Figure 3B:
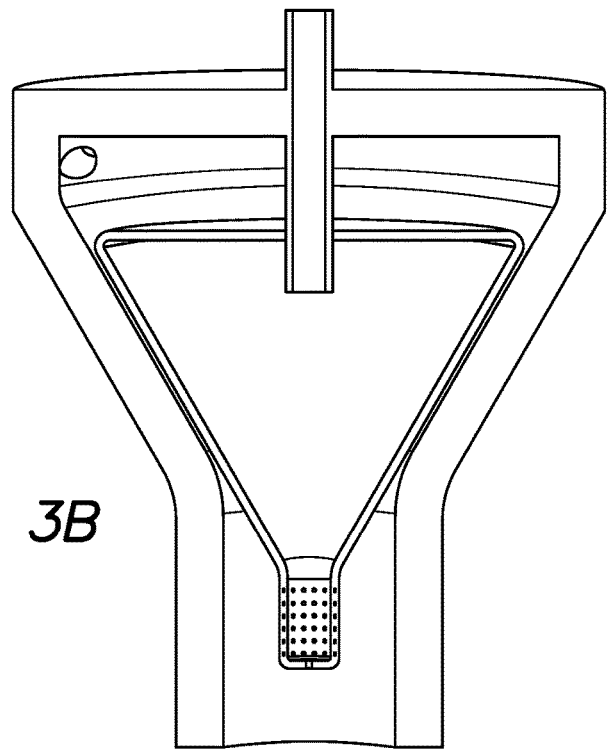
FIG. 3b illustrates the transcritical hydrocyclone in a nonoperational mode with a closed channel.
Figure 3C:
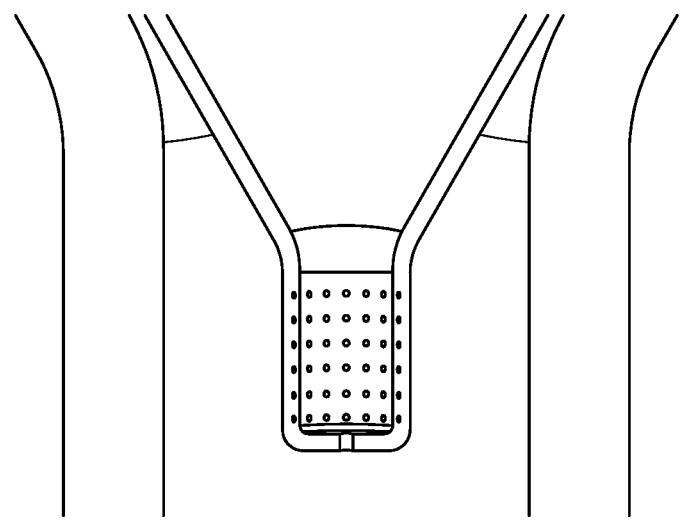
FIG. 3c shows the diffuser of the transcritical hydrocyclone.
Figure 3D:
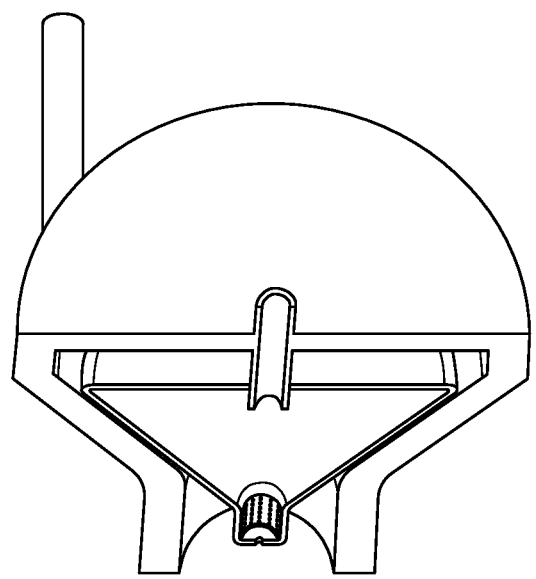
FIG. 3d shows a cutaway view of the transcritical hydrocyclone.

According to the present invention, PFAS-contaminated water has the conventional meaning. Since the inventive methods are capable of reducing the concentration of PFAS to less than 5 ppt, the method can be applied to solutions containing greater than 5 ppt, more typically, at least 1 ppm. The source of the PFAS-contaminated water can be from soil or surface or underground water in areas subjected to PFAS contamination. These areas can be industrial areas such as the electronics industry (e.g., wire/cable coatings and semiconductor board fabrication), and especially where waterproofing or non-stick coatings have been applied. Another common source of PFAS-contaminated water is in areas around airfields or firefighting training areas that have been exposed to AFFF (aqueous film forming foam). Another source can be storage vessels, typically these sources are accumulated for future destruction or disposal. Typically, there will be non-fluorinated organic compounds present in PFAS-contaminated water and, especially in AFFF residue, there can be chlorinated or brominated compounds.

Pretreatment

Debris and other solids can be removed from the PFAS-contaminated water prior destruction of the PFAS. Typically, this can be accomplished by one or a plurality of filtration steps. In some embodiments, a plurality of filtration steps can be conducted in which increasingly smaller particles are removed. The filters can be valved so that only one or a series of filters can be utilized; for example one filter or a set of filters can be cleaned or exchanged while another filter or set of filters continue to operate. Filters can be any type of filter known for filtering water such as bag filters, cartridge filters, metal screen or sand (preferably silica sand). Alternatively, or in addition, centrifugal separation can be used to remove solids.

The PFAS-contaminated water can be subjected to a softening treatment to remove undesired counterions (typically Ca and Mg) because these foul the RO membrane. These softening treatments may include one or any combination of the following: ion exchange resin, lime softening (aqueous calcium hydroxide to precipitate solids); chelating agents (for example, treatment with EDTA or the like); and reverse osmosis. In any pretreatment, capture of PFAS in pretreatment media should be considered. Alternatively, or in addition, compounds such as organics can be removed by passage through hydrophobic clay to remove separated and/or emulsified hydrocarbons.

Reverse osmosis (RO) systems can remove or concentrate PFAS from water streams. PFAS-free (or PFAS-reduced) water travels through the membrane while the PFAS and salts are directed to a brine stream. Efficiency of PFAS removal and throughput is increased by implementing a cascade of RO membranes. In some embodiments, RO is utilized to increase the concentration of PFAS by at least 5 times or at least 10 times, and in some embodiments in the range of 5 to 30 times or 5 to 20 times, or 10 to 40 times. In some preferred embodiments, the influent to RO preferably has a total dissolved solids to 1200 ppm or less; however, other systems comprising larger pumps and tighter wound membranes can handle much higher TDS and achieve effective concentration in accordance with the present invention, chlorine levels of 0.5 ppm or less more preferably 0.1 ppm or less, pH between 1 and 12, more preferably between 2 and 11, the substantial absence of oil or grease, very low levels of Ba and Si (if present initially, these can be removed in a water softening step); a flowrate depending on the scale required, in some embodiments, the RO will be conducted in a range of about 3 to 5 gallons (11 L to 19 L) per minute.

A preferred embodiment of the invention is schematically illustrated in FIG. 1. PFAS contaminated water entering the system can be subjected to numerous optional pretreatments including one of more of: filtration (not shown) storage in tank 102, a water softening pretreatment 104, a feed tank 106 connected to a reverse osmosis system 108. Water softening to replace other cations with sodium cations can be conducted by conventional means such as passage through an ion exchange resin. The reverse osmosis treatment (described above) produces a permeate 100 having PFAS concentrations that are reduced 10×, 100×, 1000×, 10,000× or more as compared to the PFAS contaminated water entering the system. In some cases, especially with relatively concentrated PFAS solution entering the system, the permeate can be subjected to additional RO treatment to bring the PFAS levels in the permeate down to a low level, such as below 70 ppt, where the water can be released to the environment; the retentate from the additional treatments can be combined with the concentrated solution or combined with incoming PFAS contaminated water such as in tank 102.

The retentate 112 typically comprises an aqueous solution having a PFAS concentration that is 10×, 100×, 1000×, 10,000× or more as compared to the PFAS contaminated water entering the system. Thus, the invention provides an energy efficient system in which greater than 90% or 99% or 99.9% or more of the PFAS in PFAS contaminated water is completely destroyed. Thus, in a preferred PFAS destruction process only 10%, or only 1%, or only 0.1%, or only 0.01% or less of the water in the PFAS contaminated water is heated to SCWO conditions.

The concentrated PFAS water can be passed through optional heat exchanger 114 which can be a tube-in-tube heat exchanger.

The concentrated PFAS water 112 passes into salt separator 116. The salt separator can have a plurality of zones that operate at different conditions of temperature or pressure. The tubes can be heated by a tube furnace that surrounds the tubes. In the case of a plurality of vertical tubes (six shown in FIG. 1, three upward and three downward) can have a relatively large inner diameter—for example, at least 1.5 cm or at least 2.0 cm or at least 1 inch (2.4 cm)—to prevent plugging. At the bottom (with respect to gravity) of each salt separator tube is a larger diameter container (collector vessel 220), preferably having an inner diameter of at least 5 cm, or at least 10 cm, or in the range of 5 to 20 cm. Preferably the collection vessel includes a diameter that is at least two times or at least four times larger than the inlet tube. The collection vessel can be heated; for example by electrical tape. The collector vessel(s) connect the inlet and outlet, preferably have a depth of at least 20 cm, or at least 30 cm, or at least 40 cm, and in some embodiments in the range of 25 to 75 cm. Salt forming in the inlet tube falls into the collection vessel where is can be continuously, or more typically, periodically removed and, if necessary, treated to remove PFAS or other contaminants. Toward the bottom of the collector vessels there is preferably a valve leading to a drain to remove brine or a briny slurry that collects at the bottom of the collector vessel. Optionally, a pump assembly can be used to evacuate the contents of the collector vessel at high pressure during operation. In some preferred embodiments, a salt separator tube inlet 222 (carrying fluid into the collector tube) extends into the collector vessel by at least 5 cm or at least 10 cm (relative to the outlet into an upward flowing tube); this enhances downward flow of the saltier fraction into the bottom of the collector tube forcing the lighter fraction out of the outlet 224. The collector vessel(s) may contain baffles to minimize turbulence and mixing near the bottom of the collector vessel(s). Typically, conditions in the bottom of the collection vessel are subcritical.

The concentrated PFAS water 112 typically enters the salt separator at subcritical but preferably near supercritical conditions so that the salt is completely dissolved in the water allowing greater residence time for salt to fall out of solution and fall into the collection vessel. Alternatively, the water 112 can enter the salt separator at supercritical conditions. In the salt separator temperature is increased so that the solution becomes supercritical and sodium chloride and other salts precipitate from solution. Conditions (typically temperature) in successive zones of the salt separator can be controlled so that the salt becomes increasingly insoluble as it travels through the salt separator. In some embodiments, the solution entering the salt separator can be below 370° C. and increased in the range of 375 to 450° C. in the salt separator. Optionally, a fuel, such as an alcohol, could be added prior to or during the salt separation stage in order to increase temperature; this may be especially desirable since heat transfer from the tube furnaces into the aqueous composition was surprisingly found to be less than predicted by calculation.

Contact of the briny subcritical phase with the supercritical phase may allow PFAS to preferentially partition into the supercritical phase; preferably the concentration of PFAS in the briny phase is at least 20 mass % less or at least 50 mass % less than in the supercritical phase. Greater than 90 mass % or greater than 95 mass % of the NaCl (or other salts that are insoluble in supercritical water) can be removed in the salt separation stage while only 5 mass % or less, or 2 mass % or less, or 1 mass % or less or 0.5 mass % of the PFAS (or organic decomposition products) is removed in the briny phase. Different salts precipitate at different temperatures and can be removed at different stages of the salt separation.

Following the salt separator, the de-salted water can pass through a heat exchanger 118 and then is typically combined with an oxidant 120, such as hydrogen peroxide, prior to introduction into SCWO reactor 144 where any remaining PFAS is destroyed. Although in the figure provided, peroxide (or other oxidant) can be added is introduced immediately before the reactor, we more than likely will have the option to add the peroxide at various locations, including upstream of the salt separator. The advantages of adding oxidant in a plurality of locations include 1) minimizing the potential for a hot spot at the location where the peroxide is added, and 2) facilitating destruction of PFAS in the salt separator. However, a disadvantage of adding peroxide upstream of the salt separators is that corrosion can be exacerbated. The PFAS-free effluent can be passed through heat exchanger(s) such as 118, 114 to recover heat and then stored or passed out of the system as PFAS-free effluent 124.

The clean effluent preferably passes back through the second and first heat exchangers. At any point after the SCWO reactor, the cleaned water is preferably neutralized, such as by addition of sodium hydroxide. Also, if necessary, the cleaned water can be treated (for example to remove Cr or other metals) prior to disposal or return to the environment.

Transcritical Hydrocyclone

In an alternative embodiment, the salt can be removed in a transcritical hydrocyclone. The transcritical hydrocyclone 30 comprises: a conical chamber 32 comprising an inlet 34 for introducing supercritical fluid into the conical chamber tangentially along an inner wall 33 of the cyclone; a top outlet 35 adapted for flow of a supercritical fluid; an exit pipe 36 adapted for flow of a liquid; a cone 37 disposed in the conical chamber adapted such that a channel 38 can be formed between the inner wall of the cyclone and an outer wall of the cone. The cone has a bottom opening which is preferably a diffuser. The diffuser has a plurality of openings 41. The openings preferably have a combined open area that is at least two times or at least three times or more than the cross-sectional area of the exit pipe. In some preferred embodiments, the holes in the diffuser can be oriented at an angle counter to the direction of flow of the cyclone; for example, if the cyclone is in the clockwise direction, the holes are oriented at an angle that is counter clockwise. Preferably, the diffuser extends into the exit pipe.

Typically, the hydrocyclone includes a fluid heat exchanger (not shown) that cools outer wall 42 of the conical chamber; typically water is the coolant. The heat exchanger is disposed on the conical section and may extend down to the exit pipe and as far down as the separator.

During operation, the salt-containing PFAS aqueous supercritical composition enters through the inlet 34 and flows tangentially along the inner wall of the conical chamber. The cone forms a conical channel 38. Preferably, the cone can be adjusted to change the cross-sectional area of the conical channel. For example, the cone can be attached to outlet pipe 35 via a threaded connection with a lock nut and/or washer. Reducing the area of the flow channel increases the velocity of the fluid through the channel.

The inner wall 33 is sufficiently cool that a small subcritical phase forms adjacent to the wall 33. Salt in the supercritical phase is relatively dense and the centrifugal force drives the salt to the inner wall 33 where it passes into the subcritical phase on the inner wall; in some cases, the subcritical phase forms droplets on the wall. The subcritical brine phase drains downward into the exit pipe. At the bottom of the exit pipe can be a two-phase gravity separator equipped with a level transmitter controller and control valve.

Supercritical Water Oxidation (SCWO)

PFAS-containing water is preferably heated prior (typically immediately prior) to entering the reactor. Heat from the reactor is used to heat water entering the reactor. The use of a heat exchanger makes the process more energy efficient, compact and extends service life of the reactor. A tube-in-tube heat exchanger is especially desirable. PFAS are destroyed and converted to carbonates, fluoride salts and sulfates. The device can be designed for 1) stationery applications or 2) transportation to a site. The stationery configuration can be employed at a permanent processing plant such as in a permanently installed water facility such as city water treatment systems. The portable units can be used in areas of low loading requirement where temporary structures are adequate. A portable unit is sized to be transported by a semi-truck or smaller enclosed space such as a trailer or shipping container. The design is adaptable to processing other organic contaminants by modifying operational parameters but without modification of the device.

A preferred SCWO reactor design is a continuous or semi-continuous system in which the (typically pre-treated) PFAS-containing aqueous solution is passed into a SCWO reactor. Because solids may form in the SCWO reactor, it is desirable for the reactor to slope downward so that solids are pulled by gravity downward and out of the reactor. In some embodiments, the flow path is straight and vertical(0°) with respect to gravity; in some embodiments, the reactor is sloped with respect to gravity, for example in the range of 5 to 70° (from vertical) or 10 to 50° or 10 to 30° or 10 to 20° and can have a bend so that flow moves in a reverse direction to provide a compact device in which flow is consistently downward with respect to gravity. Preferably, the reactor vessel is a cylindrical pipe formed of a corrosion resistant material. Desirably, the pipe has an internal diameter of at least 1 cm, preferably at least 2 cm and in some embodiments up to about 5 cm.

Flow through the components of the SCWO apparatus at supercritical conditions should be conducted under turbulent flow (Re of at least 2000, preferably in the range of 2500 to 6000). Effluent from the SCWO reactor can flow into a salt separator under supercritical conditions.

The SCWO system operates by raising the feed temperature and raising the feed pressure. The increased pressure can be due solely due to the heating (which is preferable) or can be further increased via a compressor or a high pressure (reciprocating) pump. The temperature is increased by: application of heat through the conduit (in the case of a continuous reactor) or through the reaction chamber in the case of a batch reactor, and/or by the addition of fuels such as alcohols or hydrocarbons that will be oxidized to generate heat in solution. Supercritical conditions are maintained for the oxidation; conditions within the reaction conduit or reaction chamber are preferably in the range of 374° C.-700° C. and at least 220 bar, more preferably 221-300 bar. In some embodiments, temperature in the SCWO reactor is maintained at 500° C. or more, or 600° C. or more and in the range of 500 to 650° C., or 600 to 675° C.

Oxidants

The two tested feedstocks of reactant oxygen used in supercritical water oxidation for destruction of PFAS are oxygen gas ($O_2$) and hydrogen peroxide ($H_2O_2$). In addition to, or alternative to, these two chemical species, other reactant oxygen sources or oxidizing agents could be added to destroy PFAS in the oxidation reactor. Other oxidants may comprise oxyanion species, ozone, and peroxy acids.

The preferred oxidant is hydrogen peroxide which can be added in excess (for example an excess of at least 50% or at least 100% or in the range of 50% to 300% excess) and the excess hydrogen peroxide reacting to form dioxygen and water.

Fuels

At start up, the SCWO apparatus requires heating such as by external flame or resistive heating. Unless the reactive solution comprises high concentrations of PFAS or other organics, external heating is also needed during operation. As an alternative, or in addition to external heating of the SCWO apparatus, heat can be provided by the oxidation of fuels such as alcohols. Preferred fuels include methanol, ethanol, propanol (typically isopropanol), or combinations of these.

Handling The Fluorine By-Products From Destruction Of PFAS

The corrosive effluent from the SCWO reactor containing aqueous HF at high temperature (for example, around 600° C.) can flow into a mixing pipe. Cooling water, typically containing hydroxy salts, can be fed into a mixing pipe where it mixes with the corrosive effluent. The cooled effluent contains dissolved fluoride salts such as NaF.

Post Treatment

Since the SCWO process destroys essentially all of the PFAS, the treated effluent can be safely released back into the environment. In some embodiments, at least a portion of the effluent is evaporated into the air. The vapor generated will typically be at 100% humidity because it has been cooled and in equilibrium with the aqueous phase. However, the reason that there is a vapor stream is due to the carbon dioxide formed as a reaction byproduct as well as excess oxygen to ensure complete oxidation. Feeds (such as PFAS-spiked distilled water samples) that contain relatively little organic vapor generate very little (sometimes not measurable) vapor. This is safe since the PFAS has been destroyed and any remaining contaminants (such as metals, NaF, etc.) tend to have very high vapor pressure so that they do not evaporate with the water. Precipitates such as fluoride salts can be filtered or centrifuged from the effluent. PFAS-free effluent can be passed through the heat exchanger where the effluent is cooled by the PFAS-contaminated water flowing into the reactor. If necessary, the effluent may be subjected to treatments such as reverse osmosis and/or other treatments (ion exchange resins and other adsorptive media (Metsorb™), etc.) to remove metals or other contaminants prior to release or disposal of the effluent.

Passivation of Interior Surfaces of Salt Separator or SCWO Reactor

The interior surfaces of the apparatus can be coated with corrosion resistant materials such as platinum aluminide, B4C (boron carbide), SiC (silicon carbide), TaC (tantalum carbide), WC (tungsten carbide), metal fluorides such as YF3 (yttrium fluoride), YN (yttrium nitride), LaF3 (lanthanum fluoride), LaN (lanthanum nitride), YbN, YbF3, or any lanthanide nitride or lanthanide fluoride, HfN (hafnium nitride), CeN (cerium nitride), CeF3 (cerium fluoride), TaN (tantalum nitride), Ta (tantalum), TaF (tantalum fluoride), ZrN (zirconium nitride), ZrF (zirconium fluoride), WN (tungsten nitride), or combinations thereof. The coating material resists corrosion under conditions of the process—supercritical water, typically HF, oxidant; thus protecting the underlying metal. A preferred coating material is a chromium oxide coating (preferably comprising at least 80 wt % or at least 90 or 95 wt % chromium oxide that is compatible with fluids with pH levels of 0.1 to 11 and is stable up to at least 2,300° F. (1260° C.). It is not affected by the low levels of HF content we expect in our process. The coating could be made, for example, by wash coating the apparatus walls with a slurry of chromium oxide and then baking at 752° F. to 975° F. (400° C. to 525° C.). Multiple cycles of coating and/or baking are desirable to ensure minimal to no porosity.

Alternatively or in addition, corrosion can be reduced by use of a sacrificial electrode or impressed current cathodic protection.

Mobile Units

One example of a mobile unit is one that can be transported on (and preferably operated within) a trailer. For example, the system can be transported (and optionally operated) on a trailer having dimensions of 29 feet (8.8 m) in length or less, 8 ft 6 in (2.6 m) or less width, and 13 ft 6in (4.1 m) height or less. These dimensions define preferred size of a mobile system, although workers in this area will understand that other dimensions could be utilized in a mobile unit.

Example

Reverse Osmosis— 364 kg of well water was spiked with PFAS to a concentration of 2400 ug/L. The spiked sample was passed through a water softener (measured PFAS concentration showed no change in the water softening step). The softened PFAS water was run through a Reverse Osmosis system for 160 minutes until the retentate mass was 38.5 kg. The results, where % efficiency=$(C_{feed}-C_{perm}/C_{feed}) \times 100$, is shown in the Table below:

| Analytes | RO Feed Tank | Concentrate - End of Run | Permeate - End of Run | % Efficiency |
|---|---|---|---|---|
| TOTAL PFAS | 2,383.88 | 14,416.58 | 22.86 | 99.0% |
| PFBA | 256.99 | 1,535.07 | 1.40 | 99.5% |
| PFPeA | 221.03 | 1,574.07 | 1.39 | 99.4% |
| PFHxA | 238.42 | 1,526.35 | 1.71 | 99.3% |
| PFHpA | 211.28 | 1,425.79 | 1.97 | 99.1% |
| PFOA | 502.52 | 3,239.44 | 5.70 | 98.9% |
| PFDA | 209.10 | 1,232.77 | 3.13 | 98.5% |
| PFUnA | 235.04 | 1,212.24 | 2.69 | 98.9% |
| PFDoA | 165.07 | 783.55 | 2.75 | 98.3% |
| PFTrDA | 0.22 | 1.66 | ND | 100.0% |
| pFTeDA | 0.18 | 1.43 | ND | 100.0% |
| PFHxS | 0.03 | 0.49 | ND | 100.0% |
| PFHpS | 1.47 | 5.10 | ND | 100.0% |
| PFOS | 236.63 | 1,439.95 | 1.12 | 99.5% |
| PFNS | 0.42 | 0.61 | ND | 100.0% |
| 4:2FTS | 0.37 | 1.17 | ND | 100.0% |
| 6:2FTS | 103.94 | 431.45 | 0.75 | 99.3% |
| 8:2FTS | 0.53 | 1.84 | ND | 100.0% |

The testing showed that PFAS was not removed by filters or softening. High PFAS removal efficiencies were accomplished along with a ten-fold increase in PFAS concentration in the retentate. Surprisingly, a precipitate was observed in the retentate which could be dissolved by reducing pH/addition of acid.

What is claimed:
1. A method of destroying PFAS, comprising: providing an aqueous solution comprising water and PFAS;
   subjecting the aqueous solution to reverse osmosis to produce a clean water fraction and a briny concentrated fraction in which the PFAS concentration is at least 50% greater than the aqueous solution;
   preheating the briny concentrated fraction in a heat exchanger to form a preheated concentrated fraction that is at subcritical conditions;
   passing the preheated concentrated fraction into a pre-reactor where the briny concentrated fraction is con- verted to supercritical conditions at a first temperature causing sodium chloride to precipitate;

removing at least a portion of the sodium chloride to produce a brine-reduced fraction;

passing the brine-reduced fraction to a reactor where the fraction is subjected to oxidation under supercritical conditions wherein the concentration of oxidant and/or temperature is higher than in the pre-reactor;

producing a clean hot water solution having a concentration of PFAS that is at least 90% less than the aqueous solution; and, wherein a fuel or oxidizer is added to the pre-reactor; and further comprising transferring heat from the clean hot water solution to the aqueous solution in the heat exchanger in the preheating step.

2. The method of claim 1 the fuel or oxidizer comprises an alcohol.

3. The method of claim 1 the pre-reactor comprises a trans-critical hydrocyclone.

4. The method of claim 1 the brine-reduced fraction passes through a heat exchanger and then combined with hydrogen peroxide prior to being introduced into a SCWO reactor.

5. The method of claim 1 wherein the aqueous solution comprising water and PFAS has a first volume; wherein 10% or less of a first volume is subjected to supercritical conditions; and wherein, in said method, at least 95% of the PFAS in the first volume is destroyed in supercritical conditions.

6. The method of claim 1 wherein the method is carried out in a trailer or a shipping container.

7. A method of destroying PFAS, comprising: providing an aqueous solution comprising water and PFAS;

treating the aqueous solution to reduce its volume to form a reduced volume PFAS solution having a first concentration of PFAS;

adding hydrogen peroxide to the reduced volume PFAS solution wherein the hydrogen peroxide is added in excess of that needed to destroy the PFAS;

passing the reduced volume PFAS solution into a SCWO reactor and subjecting the reduced volume PFAS solution to supercritical water oxidation; and producing a clean effluent having a concentration of PFAS that is more than 100,000 times less than the first concentration of PFAS: and wherein flow through the SCWO reactor is turbulent flow with an Re of at least 2000.

8. The method of claim 7 wherein the clean effluent comprises 5 ppt of less of PFAS.

9. The method of claim 7 comprising producing a clean effluent having a concentration of PFAS that is more than 1,000,000 times less than the first concentration of PFAS.

10. The method of claim 7 comprising producing a clean effluent having a concentration of PFAS that is more than 10,000,000 times less than the first concentration of PFAS.

11. The method of claim 7 wherein the clean effluent is treated with a solution comprising NaOH, LiOH, or KOH.

12. A method of destroying PFAS, comprising:
providing an aqueous solution comprising water and PFAS;

treating the aqueous solution to reduce its volume to form a reduced volume PFAS solution having a first concentration of PFAS;

adding hydrogen peroxide to the reduced volume PFAS solution wherein the hydrogen peroxide is added in excess of that needed to destroy the PFAS;

passing the reduced volume PFAS solution into a SCWO reactor and subjecting the reduced volume PFAS solution to supercritical water oxidation; and producing a clean effluent having a concentration of PFAS that is more than 100,000 times less than the first concentration of PFAS; and wherein the reduced volume PFAS solution is mixed with a solution comprising 30 to 50 wt % $H_2O_2$ at a weight ratio of between 30:1 and 70:1 wt % PFAS solution.

13. The method of claim 7 wherein the reduced volume PFAS solution is passed through the SCWO reactor with a residence time of 20 sec or less.

14. The method of claim 7 wherein, after start-up, no external heating is needed for the SCWO reactor.

15. The method of claim 7 wherein the method is conducted in a mobile trailer at a PFAS-contaminated site.

16. The method of claim 7 wherein SCWO reactor has an internal ceramic coating and wherein the ceramic comprises: $B_4C$ (boron carbide), SiC (silicon carbide), TaC (tantalum carbide), WC (tungsten carbide), metal fluorides such as $YF_3$ (yttrium fluoride), YN (yttrium nitride), $LaF_3$ (lanthanum fluoride), LaN (lanthanum nitride), YbN, $YbF_3$, or any lanthanide nitride or lanthanide fluoride, HfN (hafnium nitride), CeN (cerium nitride), $CeF_3$ (cerium fluoride), TaN (tantalum nitride), Ta (tantalum), TaF (tantalum fluoride), ZrN (zirconium nitride), ZrF (zirconium fluoride), WN (tungsten nitride), or combinations thereof.

17. A method of destroying PFAS, comprising:
providing an aqueous solution comprising water and PFAS;

treating the aqueous solution to reduce its volume to form a reduced volume PFAS solution having a first concentration of PFAS;

adding hydrogen peroxide to the reduced volume PFAS solution wherein the hydrogen peroxide is added in excess of that needed to destroy the PFAS;

passing the reduced volume PFAS solution into a SCWO reactor and subjecting the reduced volume PFAS solution to supercritical water oxidation; and producing a clean effluent having a concentration of PFAS that is more than 100,000 times less than the first concentration of PFAS; and wherein the SCWO reactor comprises a flow channel having an internal diameter of at least 1 cm that slopes downward with respect to gravity.

18. The method of claim 17 wherein flow through the SCWO reactor is turbulent flow with an Re of at least 2000.

19. The method of claim 7 wherein the hydrogen peroxide is added in at least 50% excess.

* * * * *